United States Patent
Lee et al.

(10) Patent No.: US 9,751,761 B2
(45) Date of Patent: Sep. 5, 2017

(54) IRON CHALCOGENIDE NANOCOMPOSITE AND METHOD FOR PREPARING SAME

(71) Applicant: PUSAN NATIONAL UNIVERSITY INDUSTRY-UNIVERSITY COOPERATION FOUNDATION, Busan (KR)

(72) Inventors: Jae-Beom Lee, Hwaseong-si (KR); Xiang Mao, Miryang-si (KR)

(73) Assignee: PUSAN NATIONAL UNIVERSITY INDUSTRY-UNIVERSITY COOPERATION FOUNDATION, Geumjeong-gu, Busan (KR)

( * ) Notice: Subject to any disclaimer, the term of this patent is extended or adjusted under 35 U.S.C. 154(b) by 265 days.

(21) Appl. No.: 14/442,251

(22) PCT Filed: Sep. 10, 2013

(86) PCT No.: PCT/KR2013/008181
§ 371 (c)(1),
(2) Date: May 12, 2015

(87) PCT Pub. No.: WO2014/042406
PCT Pub. Date: Mar. 20, 2014

(65) Prior Publication Data
US 2016/0280543 A1    Sep. 29, 2016

(30) Foreign Application Priority Data

Sep. 12, 2012 (KR) .................. 10-2012-0101089

(51) Int. Cl.
C01B 19/04    (2006.01)
C01B 19/00    (2006.01)
(Continued)

(52) U.S. Cl.
CPC .............. *C01B 19/04* (2013.01); *B82Y 30/00* (2013.01); *C01B 19/007* (2013.01);
(Continued)

(58) Field of Classification Search
CPC ............................ C01B 19/04; C09K 11/881
See application file for complete search history.

(56) References Cited

PUBLICATIONS

Fominskii, V. Yu, et al. "Specific features of ion-initiated processes during pulsed laser deposition of MoSe2 coatings in pulsed electric fields." Technical Physics Letters 38.7 (2012): 683-686.*

(Continued)

*Primary Examiner* — Richard M Rump
(74) *Attorney, Agent, or Firm* — Novick, Kim & Lee, PLLC; Jae Youn Kim

(57) ABSTRACT

The present invention relates to an iron chalcogenide nanocomposite with photoluminescent properties. The present invention also relates to a method for preparing the iron chalcogenide nanocomposite. The method includes (a) dissolving a Fe precursor in an organic solvent to form a Fe solution, (b) dissolving a chalcogen powder or a chalcogen precursor in an organic solvent to form a chalcogen solution, (c) dropwise injecting the Fe solution into the chalcogen solution to prepare a mixture solution in which an iron chalcogenide is formed, and (d) purifying the iron chalcogenide from the mixture solution.

13 Claims, 17 Drawing Sheets

(51) Int. Cl.
    *C09K 11/88*     (2006.01)
    *B82Y 30/00*     (2011.01)

(52) U.S. Cl.
    CPC ........ *C09K 11/881* (2013.01); *C01P 2002/72* (2013.01); *C01P 2002/84* (2013.01); *C01P 2002/85* (2013.01); *C01P 2002/88* (2013.01); *C01P 2004/01* (2013.01); *C01P 2004/04* (2013.01); *C01P 2004/52* (2013.01); *C01P 2004/64* (2013.01)

(56) References Cited

PUBLICATIONS

Karl D. Oyler, et al. "Chemical Synthesis of Two-Dimensional Iron Chalcogenide Nanosheets: FeSe, FeTe, Fe(Se, Te), and FeTe2", Chemistry of Materials, 2009, vol. 21, pp. 3655-3661.

K. O. Kvashnina, et al. "Electron transfer during selenium reduction by iron surfaces in aqueous solution: high resolution X-ray absorption study", Journal of Physics: Conference Series, 2009, vol. 190, Article ID: 012191, pp. 1-4.

Ian T. Sines, et al. "Phase-Selective Chemical Extraction of Selenium and Sulfur from Nanoscale Metal Chalcogenides: A General Strategy for Synthesis, Purification, and Phase Targeting", Journal of the American Chemical Society, 2011, vol. 133, pp. 1294-1297.

M. Jouanne, et al. "Raman Scattering by 3d6 Electrons of Fe2+ in Zinc Blende Diluted Magnetic Semiconductors", Solid State Communications, 1992, vol. 83, No. 12, pp. 1061-1064.

\* cited by examiner

IRON CHALCOGENIDE NANOCOMPOSITE AND METHOD FOR PREPARING SAME

TECHNICAL FIELD

The present invention relates to an iron chalcogenide nanocomposite with photoluminescent properties and a method for preparing the same.

BACKGROUND ART

Transition metal chalcogenides have received attention in various applications, including thermoelectrics, magnetic semiconductors, superconductors, quantum dots, sensors, and photovoltaics because of their unique structures and electrical properties. A significant number of high-quality metal chalcogenide nanostructures have been prepared employing colloidal synthetic approach. Most previous studies have focused on Groups 2-4 semiconductor nanostructures, such as CdSe, CdS, Zns, ZnSe, CdTe, CdSe, $Ag_2Se$, NiSe, and $Ag_2S$ and have investigated their optical properties.

However, other potential semiconducting metal chalcogenide nanostructures, especially materials having phase-selectivity problems in the synthesis, have not been investigated until now. For example, iron selenides have two stoichiometric phases, FeSe and $FeSe_2$. FeSe forms a tetragonal or hexagonal crystal, whereas $FeSe_2$ forms a crystal in the cubic or rhombic (marcasite-type) structure. Both phases have $Fe^{2+}$ ions and their phase-selective syntheses are challenging. Such iron selenides have excellent conductive, optical, electrical, and magnetic properties with a direct band gap (1.23 eV) and can be semiconductors or even superconductors with the characteristics of ferromagnetic/ferrimagnetic metals. For example, PbO-type FeSe exists only in a narrow synthesis zone of 50.6 to 51.0%. It is known that iron elements become superconductors when they have very accurate compositional and specific structural features. NiAs-type FeSe is also a very rare 1:1 Fe—Se compound, exists in a synthesis zone of 42.0 to 50.5%, and is not a superconductor. However, only few iron selenides are known so far. Despite many efforts to synthesize PbO-type FeSe nanoparticles, studies on the optical properties of other potential semiconducting iron chalcogenide nanocomposites still remain in the early stages. Furthermore, attempts to synthesize highly photoluminescent iron chalcogenide nanocomposites have not been successful.

DETAILED DESCRIPTION OF THE INVENTION

Problems to be Solved by the Invention

One object of the present invention is to provide an iron chalcogenide nanocomposite with photoluminescent properties.

A further object of the present invention is to provide a method for preparing an iron chalcogenide nanocomposite.

Means for Solving the Problems

One aspect of the present invention provides an iron chalcogenide nanocomposite with photoluminescent properties.

A further aspect of the present invention provides a method for preparing an iron chalcogenide nanocomposite, including (a) dissolving a Fe precursor in an organic solvent to form a Fe solution, (b) dissolving a chalcogen powder or a chalcogen precursor in an organic solvent to form a chalcogen solution, (c) dropwise injecting the Fe solution into the chalcogen solution to prepare a mixture solution in which an iron chalcogenide is formed, and (d) purifying the iron chalcogenide from the mixture solution.

Effects of the Invention

The iron chalcogenide nanocomposite of the present invention has excellent photoluminescent properties even without heavy metals. Therefore, the iron chalcogenide nanocomposite of the present invention can be considered an environmentally friendly alternative to conventional photoluminescent materials and is effectively applicable to various fields, including semiconductors. In addition, it is expected that the method of the present invention will be applied to the synthesis of other metal chalcogenides.

BEST MODE FOR CARRYING OUT THE INVENTION

Figure 1:
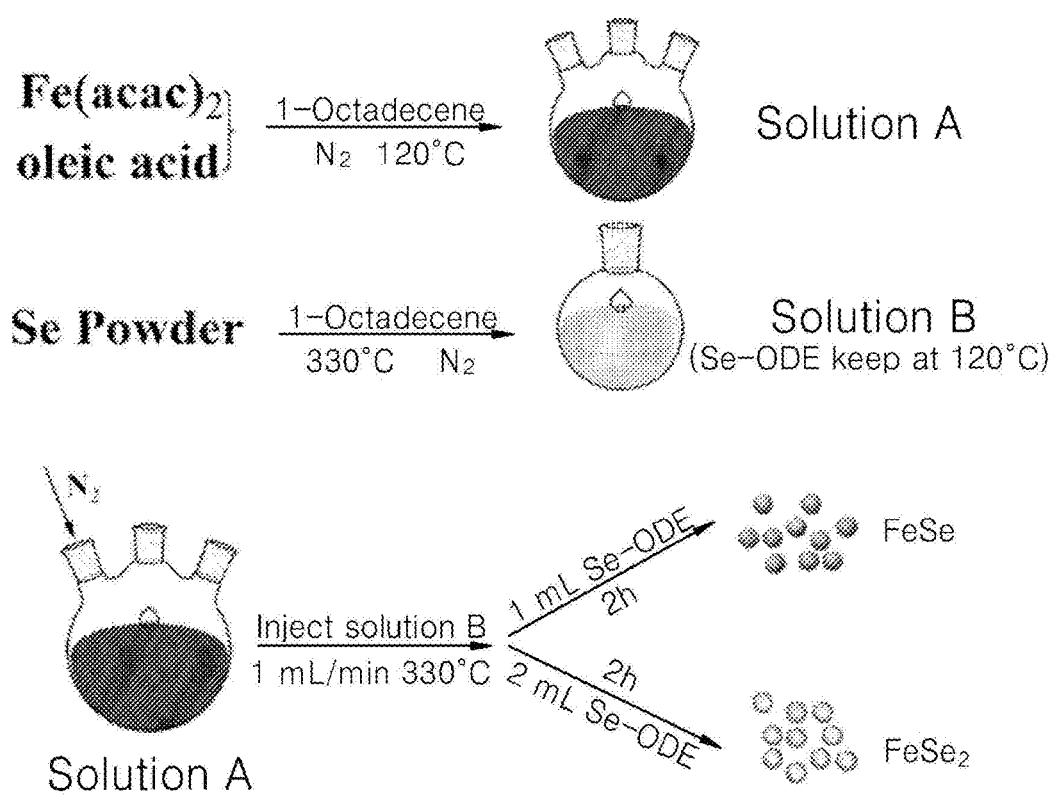
FIG. 1 schematically shows a method for synthesizing $FeSe_x$ (x=1, 2) according to one embodiment of the present invention.

One aspect of the present invention is directed to an iron chalcogenide nanocomposite with photoluminescent properties.

Preferably, the nanocomposite has a NiAs-type phase crystal structure.

The chalcogen is preferably S, Se or Te and the iron chalcogenide is more preferably FeSe or $FeSe_2$.

A further aspect of the present invention is directed to a method for preparing an iron chalcogenide nanocomposite, including (a) dissolving a Fe precursor in an organic solvent to form a Fe solution, (b) dissolving a chalcogen powder or a chalcogen precursor in an organic solvent to form a chalcogen solution, (c) dropwise injecting the Fe solution into the chalcogen solution to prepare a mixture solution in which an iron chalcogenide is formed, and (d) purifying the iron chalcogenide from the mixture solution. According to the method of the present invention, an iron chalcogenide is synthesized by individually preparing two different solutions, i.e. an iron solution and a chalcogen solution, and mixing the solutions by injection under heating to prepare a mixture solution.

In step (a) or (b), the organic solvent is preferably heated to 100 to 140° C.

The organic solvent is preferably selected from the group consisting of ether-based compounds ($C_nOC_n$, Cn: hydrocarbon, $4 \leq n \leq 30$), hydrocarbons ($C_nH_{2n+2}$, $7 \leq n \leq 30$), unsaturated hydrocarbons ($C_nH_{2n}$, $7 \leq n \leq 30$), and organic acids ($CnCOOH$, $C_n$: hydrocarbon, $5 \leq n \leq 30$).

The ether-based compounds are more preferably selected from the group consisting of trioctylphosphine oxide (TOPO), alkylphosphines, octyl ether, benzyl ether, and phenyl ether. The hydrocarbons are preferably selected from the group consisting of hexadecane, heptadecane, and octadecane. The unsaturated hydrocarbons are preferably selected from the group consisting of octene, heptadecene, and octadecene. The organic acids are preferably selected from the group consisting of oleic acid, lauric acid, stearic acid, mysteric acid, and hexadecanoic acid.

In step (c), the Fe solution is injected dropwise into the chalcogen solution, followed by heating to 250 to 400° C. to prepare a mixture solution in which an iron chalcogenide is formed. When the heating is performed within the temperature range defined above, a uniformly textured composite can be prepared from the highly volatile chalcogen powder or chalcogen precursor and precursor components, such as iron ions. In the Examples Section that follows, the heating was performed at 330° C.

In step (c), a surfactant is preferably added to and mixed with the mixed solution. The use of the surfactant avoids unwanted precipitation and facilitates collection of the final product. The surfactant is more preferably an organic acid rather than a general-purpose surfactant, such as oleylamine, octadecylamine or trioctylphosphine. The organic acid is selected from the group consisting of oleic acid, lauric acid, stearic acid, mysteric acid, hexadecanoic acid, and mixtures thereof. The use of the surfactant facilitates the collection of the final product on the inner wall of a glass flask at a high temperature, unlike an existing synthetic method employing a general-purpose surfactant.

Preferably, the Fe precursor and the chalcogen or chalcogen precursor are used in a molar ratio of 1:1-2. Iron chalcogenides with different photoluminescent properties may be prepared by varying the amounts of the precursor components.

The chalcogen is S, Se or Te and the iron chalcogenide is more preferably FeSe or $FeSe_2$.

MODE FOR CARRYING OUT THE INVENTION

The present invention will be explained in more detail with reference to the following examples. These examples are provided for illustrative purposes only and are not intended to limit the scope of the present invention.

EXAMPLES

Materials:

Iron (II) acetylacetonate ($Fe(acac)_2$), Rhodamine B (RhB 98%), a selenium powder (Se average diameter 100 mesh), octadecene (ODE, 98%), oleic acid (OA, 98%), and oleylamine (OLA, technical grade 98%) (Sigma-Aldrich) were prepared ($O_2$ was removed by vacuum suction at room temperature for 2 h before addition of OA and OLA to the solution).

Apparatuses:

High-resolution transmission electron microscopy (HR-TEM) images and energy dispersive spectra (EDS) were recorded with a JEOL JEM-3010 microscope (Boston, USA) operating at an accelerating voltage of 200 kV.

TEM samples were prepared by drop casting a dilute solution of a nanostructure in hexane or toluene on an ultrafine carbon-coated copper grid. Three-dimensional transmission electron microscopy (3D-TEM) images were characterized through electronic states in a TEM field (EM912Ω, Carl zeiss, Germany) operating at 120 kV. All bright field (BF)-TEM images were obtained as zero-loss filtered images.

Scanning electron microscopy (SEM) images were obtained using a Hitachi S-4700 FE-SEM at a voltage of 20 KV.

XRD samples were collected using Cu—Kα radiation by drop casting or dip coating solutions of $FeSe_x$ (x=1, 2) nanostructures on glass substrates.

Fluorescence microscopy images were obtained by depositing a drop of a colloidal solution on a glass substrate and covering the drop with a cover slip (Leica, Heidelberg, Germany).

Photoluminescence (PL) intensities were measured using a fluorescence spectrophotometer (Hitachi F-7000, Japan).

The absorbance values of nanocomposites were measured using a UV/Vis spectrophotometer (Scinco, 5310, Korea).

The fluorescence lifetimes (τ) of samples were measured using a light emitting diode (TM-200 LED strobe Lifetime spectrophotometer 3113, PTI Inc., USA) at an excitation wavelength of 380 nm.

Preparation of $FeSe_x$ (x=1, 2) Nanocomposites:

All syntheses were performed using Schlenk line systems. A three-neck round bottom flask was placed in a heating mantle (EMA 1000/CEB1, Barnstead/Electrothermal, Britain), and then one neck of the flask was connected to a condenser and the other two necks were capped by septa. A mantle heating system was used for temperature control.

Synthesis of $FeSe_x$ (x=1)

First, 0.04 mM $Fe(acac)_2$, 2 mL of OA, and 7 mL of ODE were mixed together at room temperature and heated at 120° C. for 2 h to achieve complete dissolution. The solution turned deep red in color. The solution was called "Solution A".

Next, 1 mL of ODE and a 0.04 mM fine Se powder were mixed in a separate flask and allowed to stand in a vacuum pump for 0.5 h while maintaining the temperature at 120° C.

until the metal ions were completely dissolved. Unreacted reactants were removed by nitrogen gas purging to prevent unwanted oxidation in the flask. The solution was called "Solution B". Solution B was heated at 330° C. for ≥1 h, cooled down, and maintained at 120° C. for ≥1 h. The solution gradually became colorless, revealing complete dissolution of the Se powder in the ODE.

Thereafter, a calculated amount of Solution B was rapidly injected into Solution A with vigorous stirring through a syringe. The mixture solution gradually turned back to colorless (see FIG. 2a). After 0.5 h, the mixture solution was cooled to 110° C., left standing under vacuum for 20 min, and heated at 330° C. for 2 h. Then, the heating mantle was removed, a reaction tube was connected to the flask to cool the mixture solution at room temperature, the final mixture solution was transferred to a test tube, and 5 mL of hexane and 15 mL of ethanol were added thereto. The mixture was centrifuged at 8500 rpm for 0.5 h. The clear supernatant was discarded and the precipitate was dispersed in hexane. FeSe as the final product was purified several times and dispersed in hexane.

Synthesis of $FeSe_x$ (x=2)

$FeSe_2$ was synthesized in the same manner as in the synthesis of $FeSe_x$ (x=1), except that 2 mL of Solution B was further added to prepare a mixture solution.

Results

The procedure for the synthesis of $FeSe_x$ is schematically shown in FIG. 1. Results of the $FeSe_x$ (x=1, 2) nanocomposites will be explained with reference to the accompanying drawings.

Figure 2:
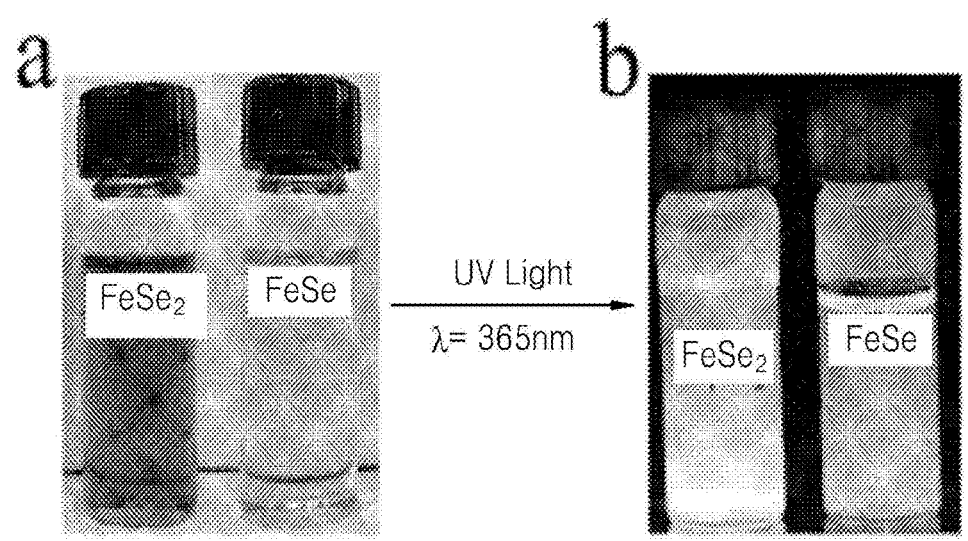
FIG. 2 shows (a) solutions of FeSe and $FeSe_2$ nanoparticles and (b) photoluminescence of the nanoparticles.

FIG. 2 shows images of the synthesized nanocomposites. Dropwise injection of Solution A into Solution B resulted in a color change of the mixture solutions to yellowish or yellowish brown during heating ((a) of FIG. 2), demonstrating the preparation of the final $FeSe_x$ (x=1, 2). The $FeSe_x$ (x=1, 2) nanocomposites showed photoluminescent properties when irradiated with ultraviolet light at a 365 nm wavelength ((b) of FIG. 2).

Figure 3:
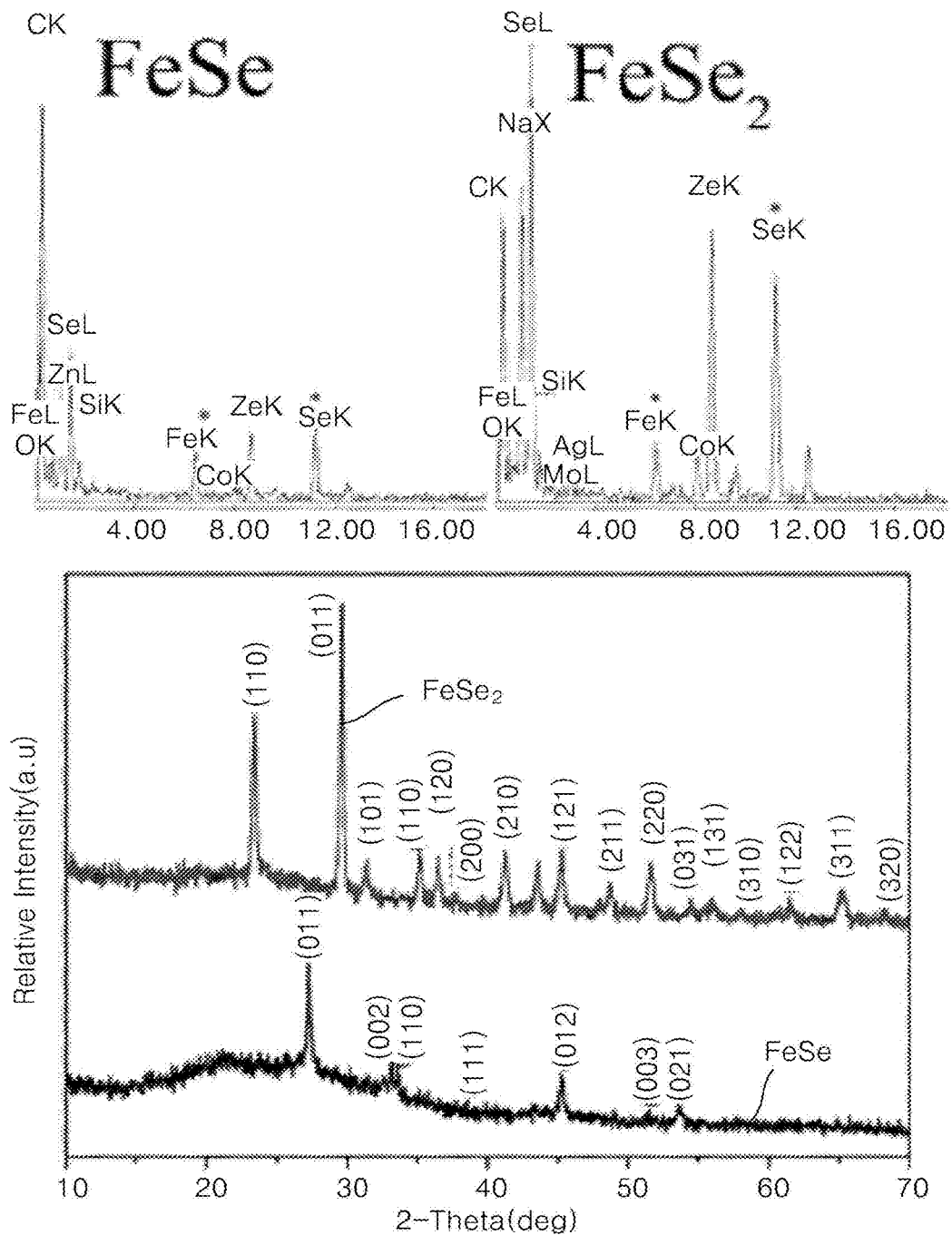
FIG. 3 shows the results of TEM-EDX for FeSe and $FeSe_2$ (top) and XRD patterns of FeSe (black curve) and $FeSe_2$ (red curve) (bottom).

FIG. 3 shows the results of TEM-EDX for the synthesized FeSe and $FeSe_2$ (top) and XRD patterns of the FeSe and $FeSe_2$ (bottom). Particularly, the TEM-EDX analysis revealed that the element ratios of Fe:Se in the nanocomposites were 1:1.05 (for FeSe) and 1:2.17 ($FeSe_2$). These results indicate that the compositions of the $FeSe_x$ (x=1, 2) nanocomposites were determined by the molar ratio of the precursor components. All diffraction peaks in the XRD patterns of FeSe (JCPDS 03-0533) and FeSe2 (JCPDS21-0432) were well associated with the reference crystal structures, and the diffraction peaks of the $FeSe_2$ nanoparticles were stronger and more discernible than those of the FeSe nanoparticles, which was attributed to the crystallinities of the nanocomposites. Since the crystallinity is greatly improved with increasing amount of the Se precursor, the amount of the Se precursor is believed to determine the crystallinity as well as the kind of the final product.

Figure 4:
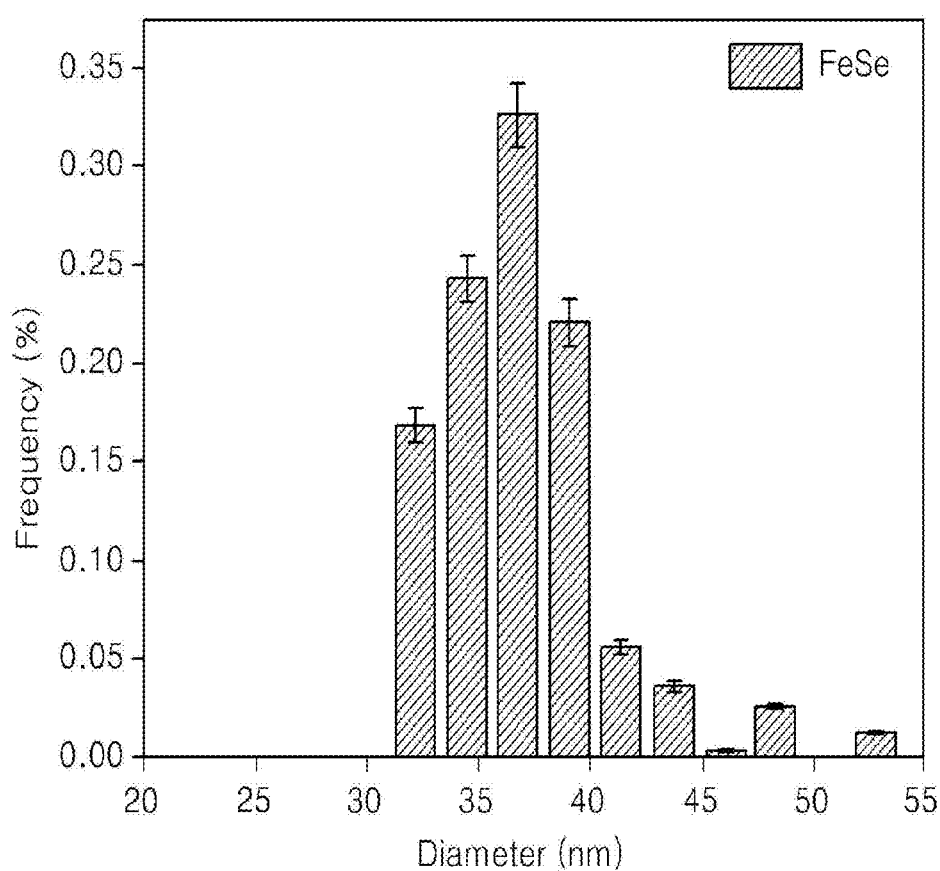
FIG. 4 is a histogram showing the size distribution of FeSe synthesized in the Examples section.
Figure 5:
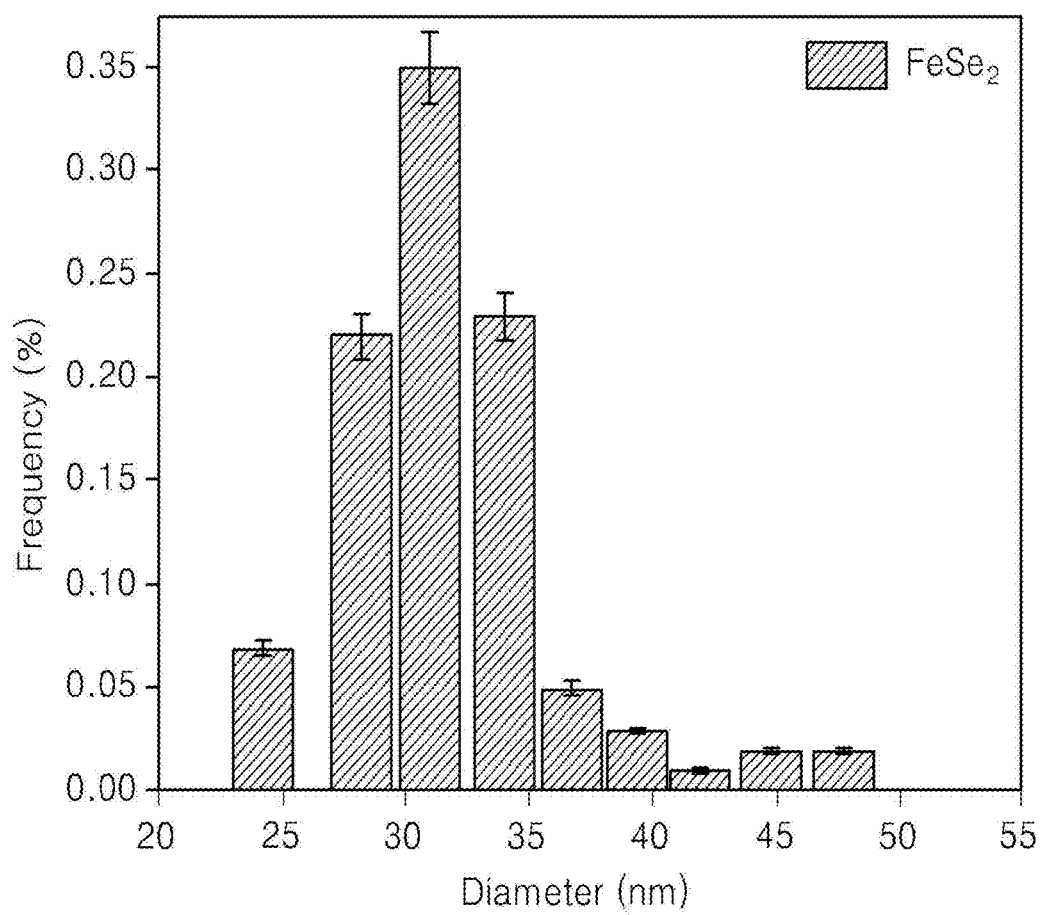
FIG. 5 is a histogram showing the size distribution of $FeSe_2$ synthesized in the Examples section.

FIGS. 4 and 5 show the size distributions of the synthesized FeSe and $FeSe_2$, respectively. As can be seen from FIGS. 4 and 5, the average size of the FeSe nanocomposite was slightly larger than that of the $FeSe_2$ nanocomposites. The diameters of the FeSe and $FeSe_2$ nanocomposites were 36±4.1 nm and 32±5.3 nm, respectively. Generally, the crystallinity of a nanomaterial is determined from the phase change of a precursor or heating conditions (e.g., heating temperature and time) during reaction. From the above results, it is believed that this size difference was due to the amount of the Se element and the phase separation mechanism during synthesis because the two nanocomposites had uniform size distributions and were synthesized under the same nucleation and crystal growth conditions. Further, since the heating was controlled under the exactly same conditions, the amount of the Se precursor used is considered an important factor that improves the crystallinity.

Figure 6:
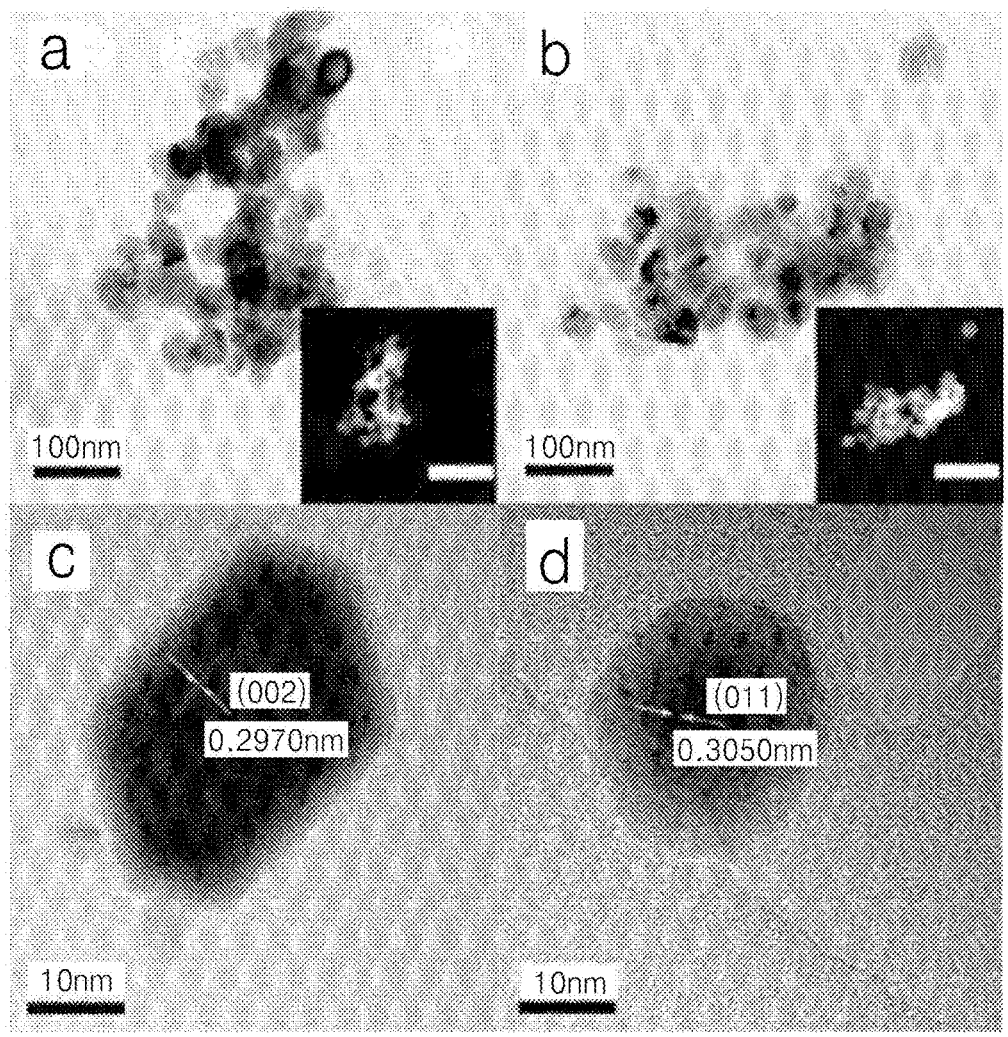
FIG. 6 shows TEM images of (a) FeSe and (b) $FeSe_2$ (insets show STEM images, scale bars represent 200 nm), and HR-TEM images of (c) FeSe and (d) $FeSe_2$.
Figure 7:
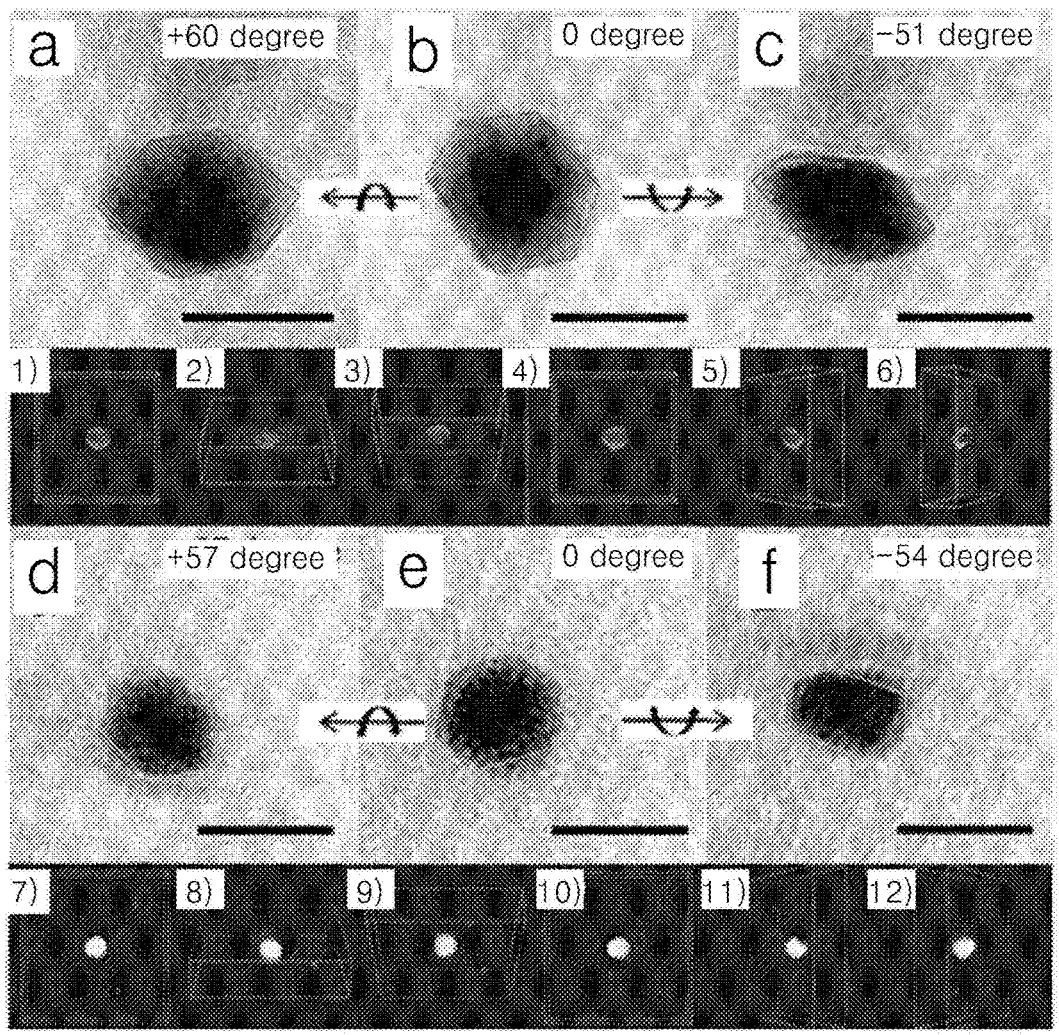
FIG. 7 shows a, b, and c) TEM images of a FeSe nanocomposite (at +60°, 0°, and −51° with respect to the X-axis, respectively); (d, e, f) TEM images of a $FeSe_2$ nanocomposite (at +57°, 0°, and −54°, respectively); 1)-6) 3D TEM morphological images of a FeSe nanocomposite at different viewing angles; and 7)-12) TEM morphological images of a $FeSe_2$ nanocomposite at different viewing angles.
Figure 8:
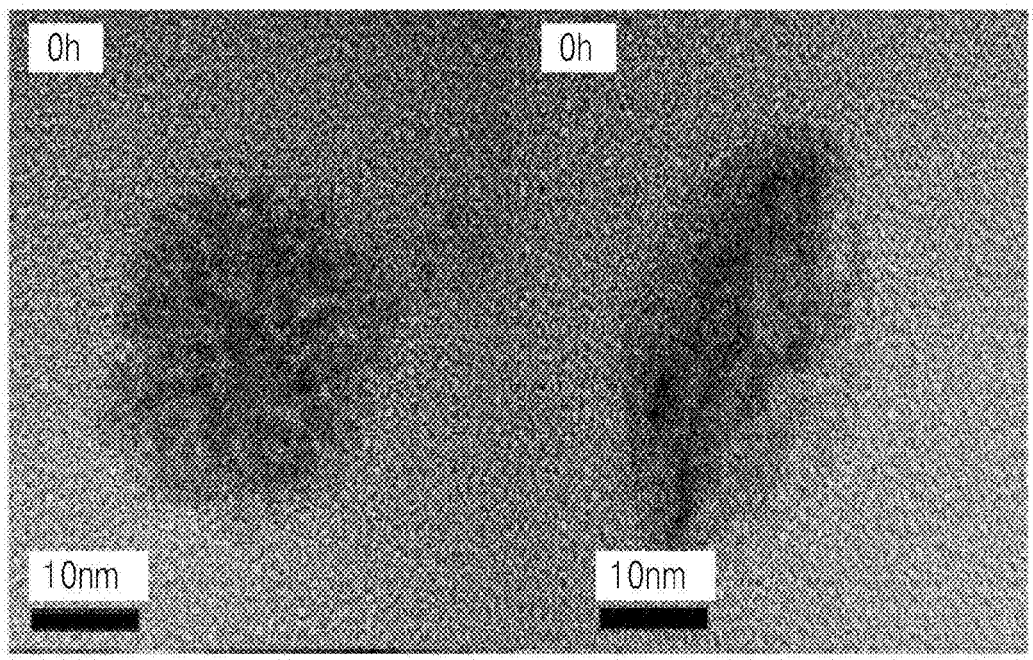
FIGS. 8 to 11 shows TEM images of FeSe (left) and $FeSe_2$ nanocomposites (right) after heating for different times (0 h, 0.5 h, 1 h, and 1.5 h) during their synthesis.
Figure 9:
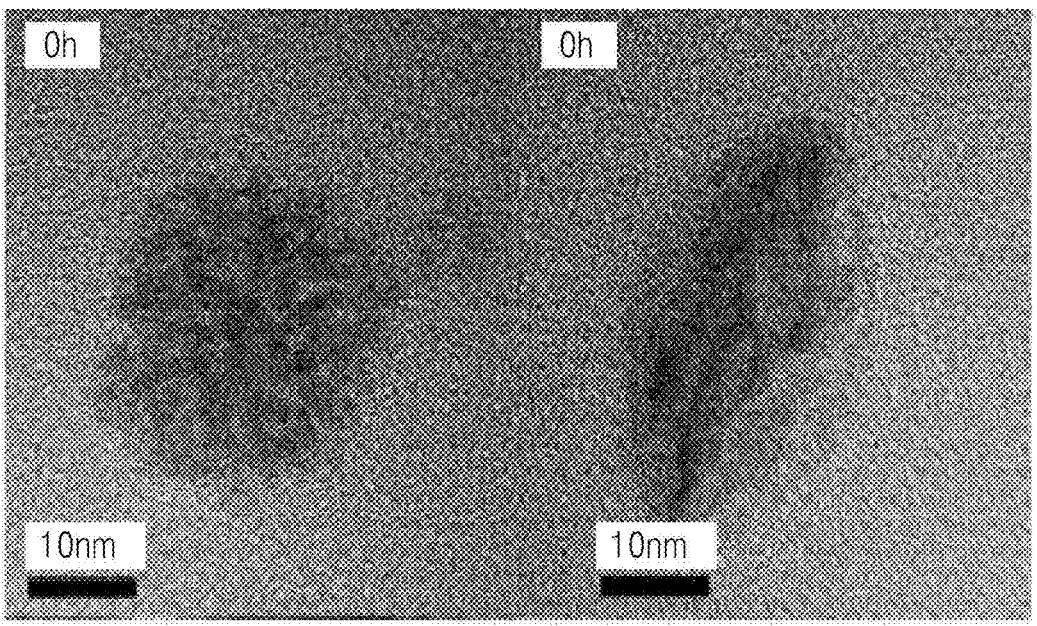
Figure 10:
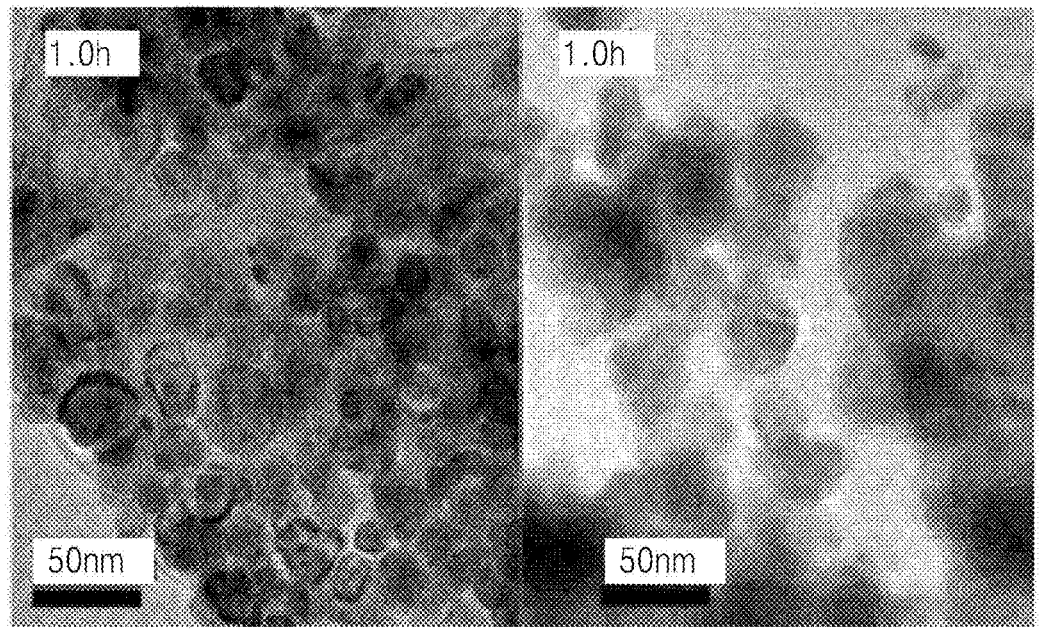
Figure 11:
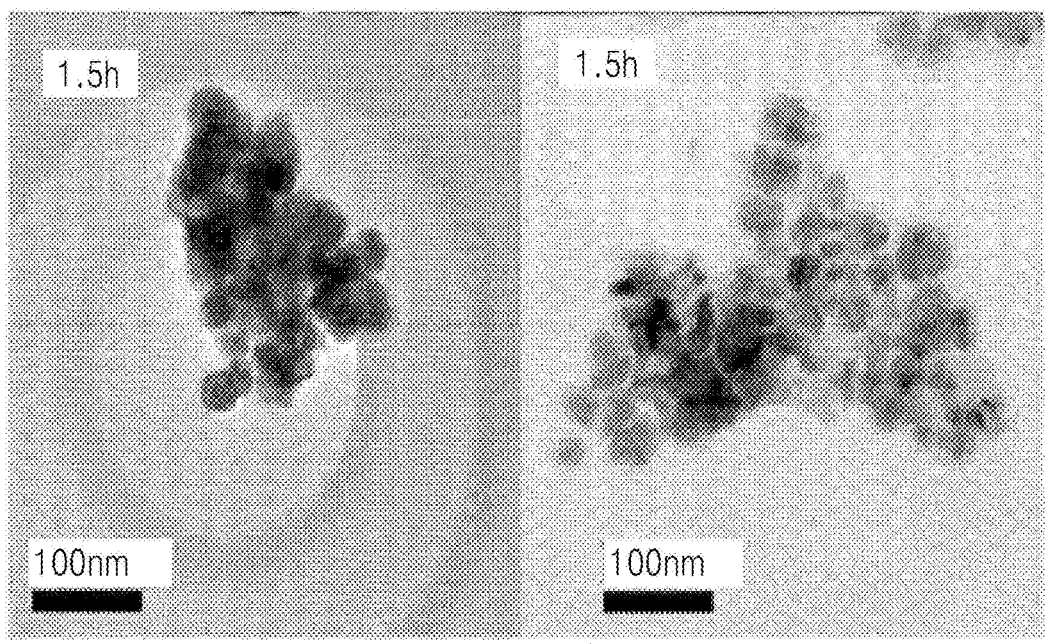

FIG. 6 shows the results of transmission electron microscopy (TEM) and high-resolution transmission electron microscopy (HR-TEM) for the synthesized FeSe and $FeSe_2$ nanocomposites. FIG. 7 shows three-dimensional transmission electron microscopy (3D-TEM) images of the FeSe and $FeSe_2$ nanocomposites, confirming that the nanocomposites had hexagonal phase crystal structures. The white lines shown in c and d of FIG. 6 represent the spacing between the adjacent lattices during crystal growth of the nanoparticles, showing that the inner planes correspond to the FeSe (002) and $FeSe_2$ (011) distances.

FIGS. 8 to 11 show a series of TEM images of the nanocomposites grown in the individual synthesis steps. The final products correspond to hexagonal NiAs-type phase crystal structures. The slight difference in structure between the FeSe and $FeSe_2$ nanocomposites appears to be associated with the element used in different amounts.

Figure 12:
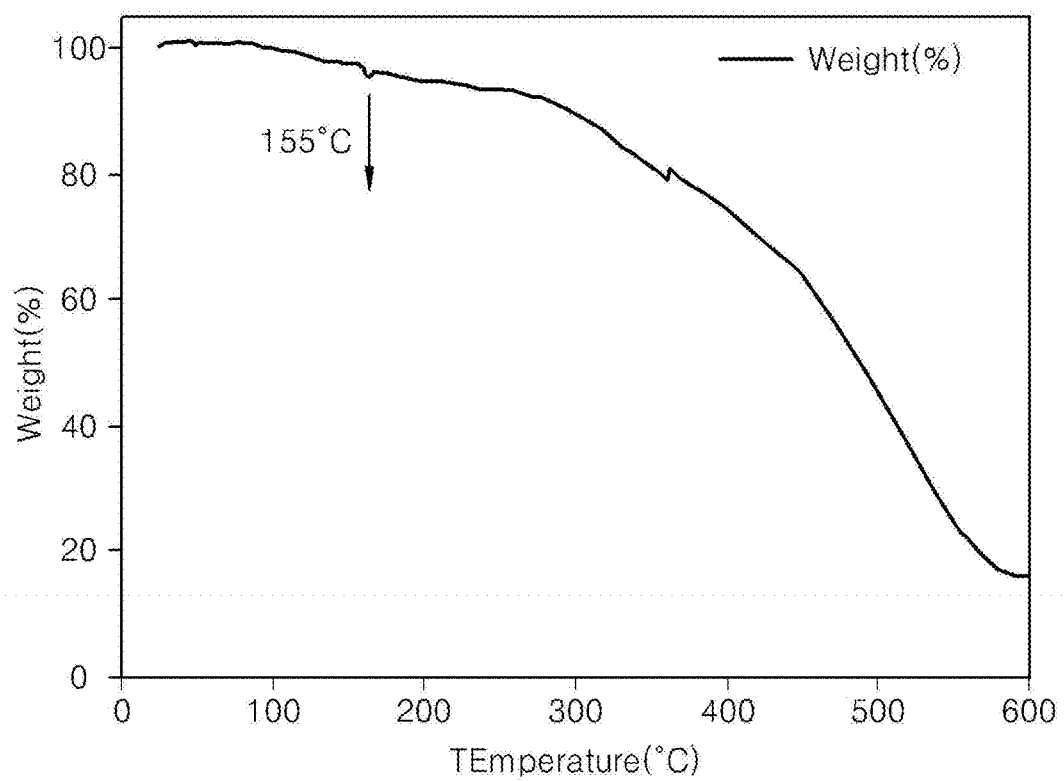
FIG. 12 shows the results of thermogravimetric analysis (TGA) for FeSe in nitrogen gas.
Figure 13:
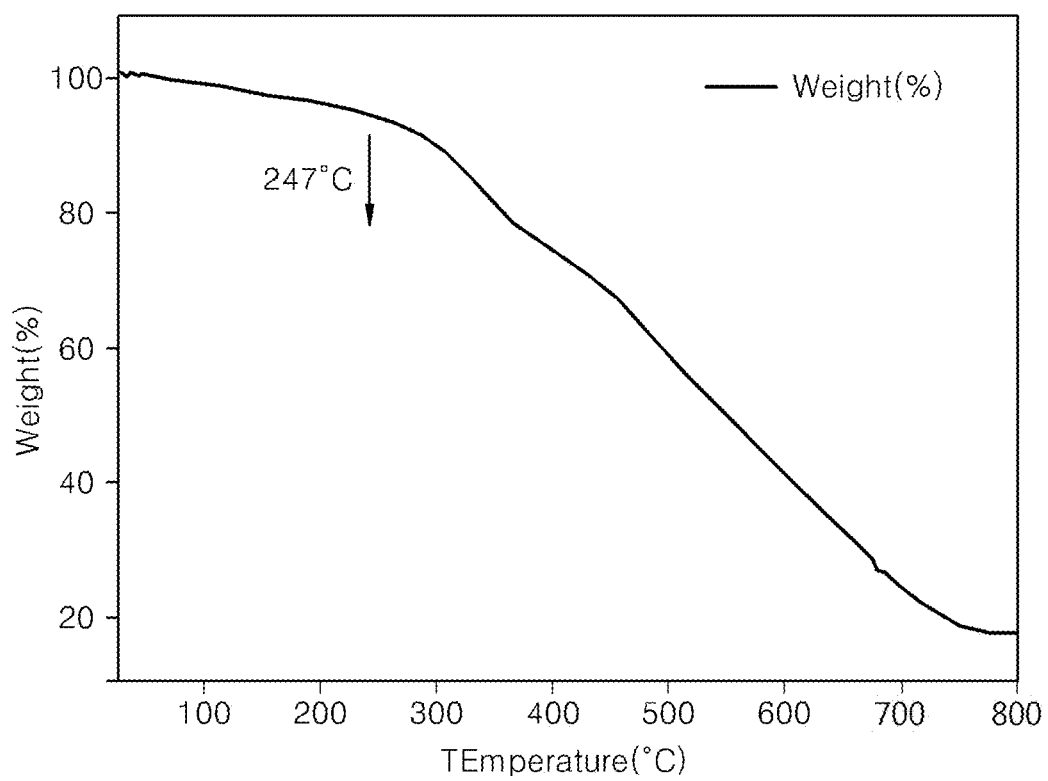
FIG. 13 shows the results of thermogravimetric analysis (TGA) for $FeSe_2$ in nitrogen gas.

FIGS. 12 and 13 show the results of thermogravimetric analysis (TGA) for FeSe and $FeSe_2$ in nitrogen gas. Thermogravimetric analysis was performed by heating from room temperature to 600° C. (FeSe) and 800° C. ($FeSe_2$) at a rate of 15° C./min. As a result, the decomposition onset temperatures of the $FeSe_2$ and $FeSe_2$ nanocomposites were approximately 155° C. and 247° C., respectively, and the decomposition completion temperatures of the $FeSe_2$ and $FeSe_2$ nanocomposites were approximately 605° C. and 807° C., respectively. The nanocomposites underwent weight losses of about 80% after final decomposition. When comparing such decomposition processes, the $FeSe_2$ nanocomposite was more stable than the FeSe nanocomposite.

Figure 14:
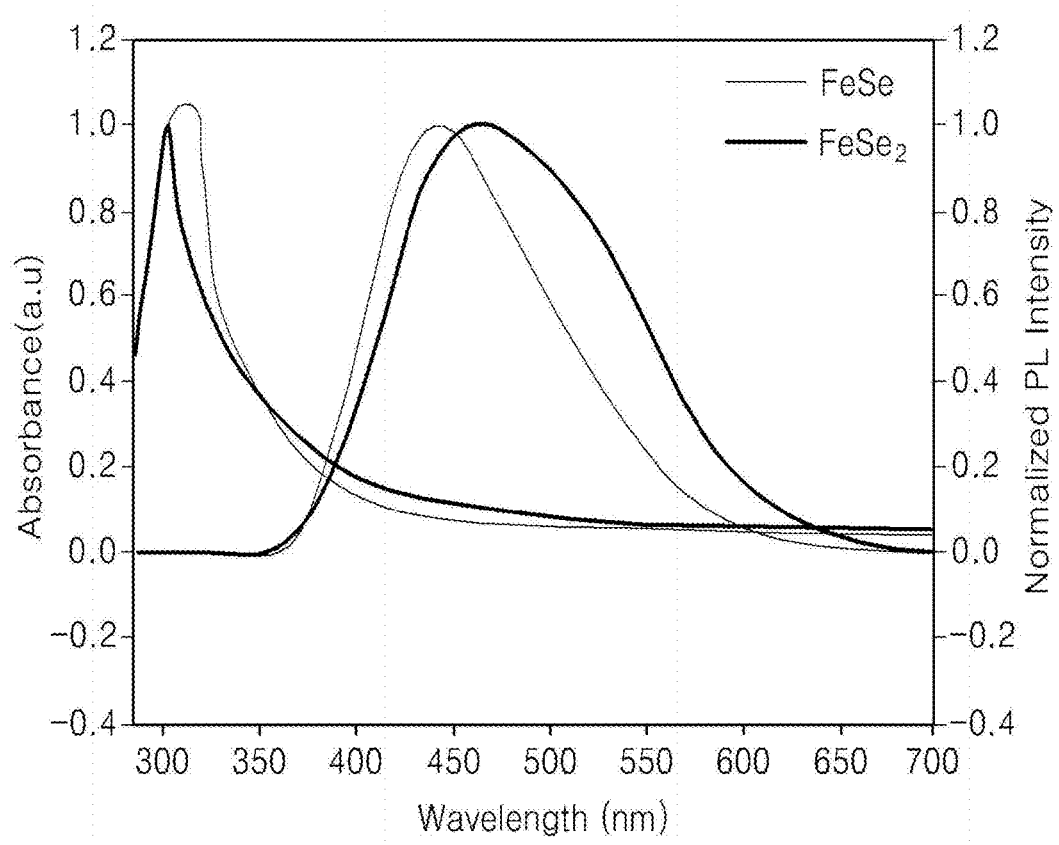
FIG. 14 shows the UV and PL intensities of FeSe and $FeSe_2$.
Figure 15:
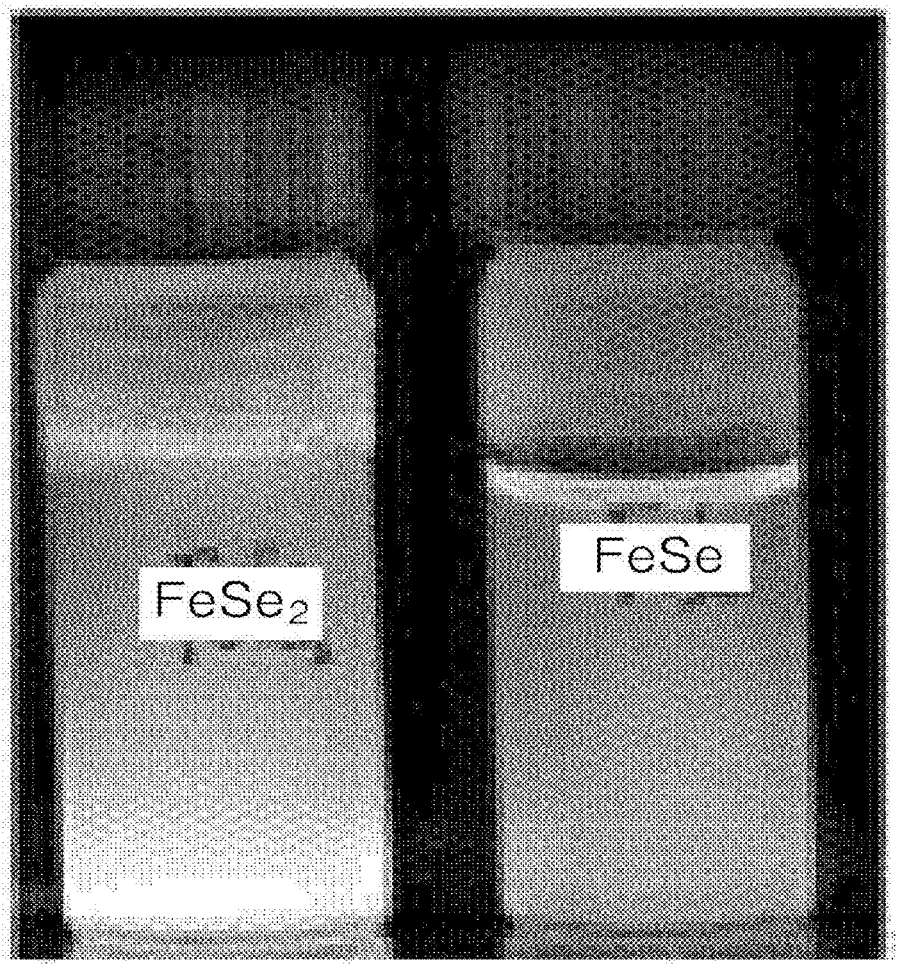
FIG. 15 shows fluorescence images of FeSe (right) and $FeSe_2$ (left) in bottles.
Figure 16:
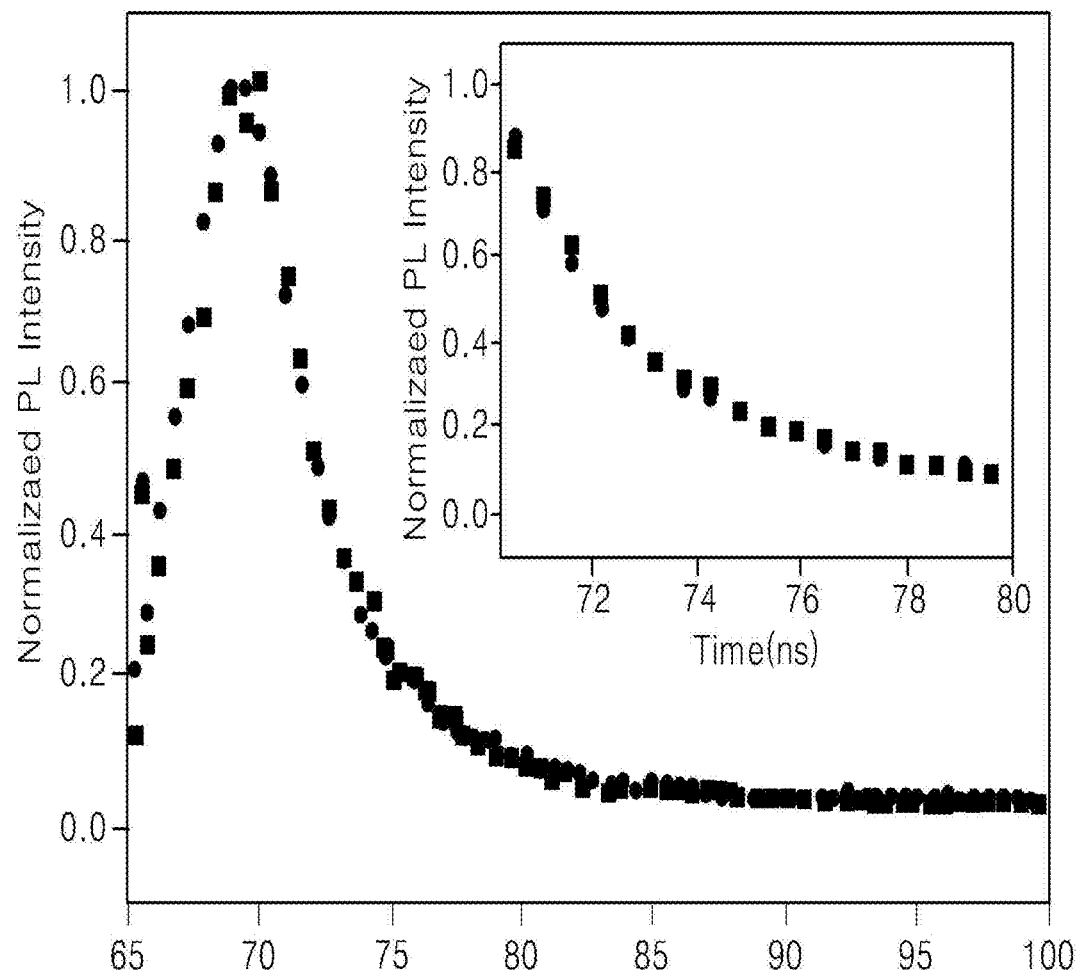
FIG. 16 shows fluorescence lifetime spectra of FeSe and $FeSe_2$.
Figure 17:
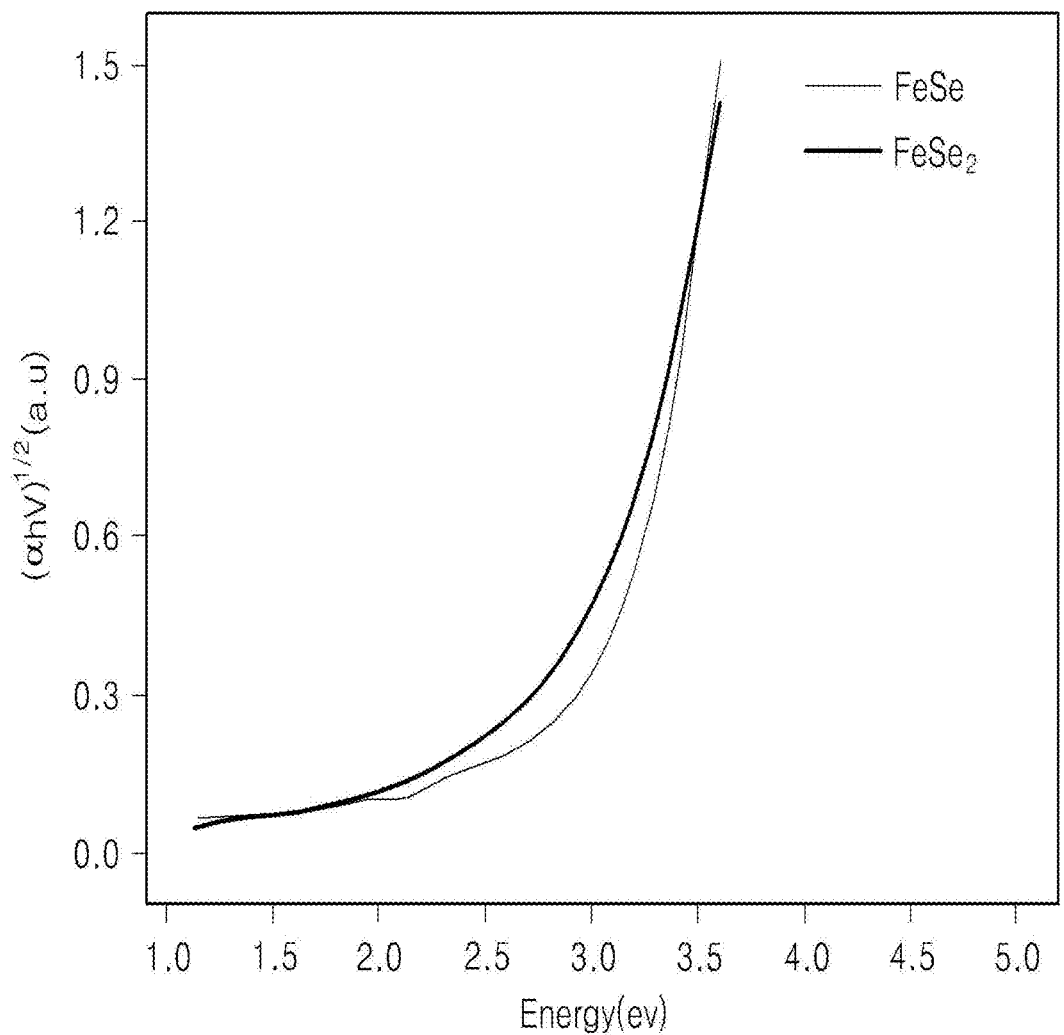
FIG. 17 shows the dependence of $(\alpha h\nu)^{1/2}$ of synthesized FeSe and $FeSe_2$ nanocomposites on hν.

FIGS. 14 to 17 show the optical and electrical properties of the FeSe and $FeSe_2$ nanocomposites. Referring to FIG. 14, the absorption bands of the nanocomposites were observed at wavelengths of about 300 nm, and strong photoluminescence (PL) bands of the FeSe and $FeSe_2$ nanocomposites in n-hexane solutions at room temperature were measured at wavelengths of 447 nm and 462 nm, respectively. FIG. 15 shows fluorescence images of solutions of the nanoparticles in bottles. Referring to FIG. 15, the $FeSe_x$ nanocomposites showed strong luminescence irrespective of their kind. Referring to FIG. 16, the $FeSe_x$ nanocomposites had full widths at half maximum of 100 nm, which is a typical wavelength contributing to the size distribution of the nanocomposites. The bandwidths of the nanocomposites were relatively narrow. When Rhodamine B was used as a standard, the quantum yields of the nanocomposites were approximately 20% (FeSe) and 16% ($FeSe_2$). The fluorescence lifetimes (τ) of the nanocomposites were 3.07±0.023 ns (FeSe) and 2.54±0.018 ns ($FeSe_2$). Based on the optical observation of the nanoparticles, the bandwidths of the nanoparticles were estimated from the relationship between $(\alpha h \nu)^{1/2}$ and hν, where α is the absorbance, h is the Planck's constant, and u is the frequency (FIG. 17). As a result, the energy bandwidths of the $FeSe_x$ nanocomposites were found to be in the range of 2.25-2.51 eV, which were slightly broader than that of the reference. Such results are believed to arise from the nanosize effects and crystal structures of the nanocomposites.

Figure 18:
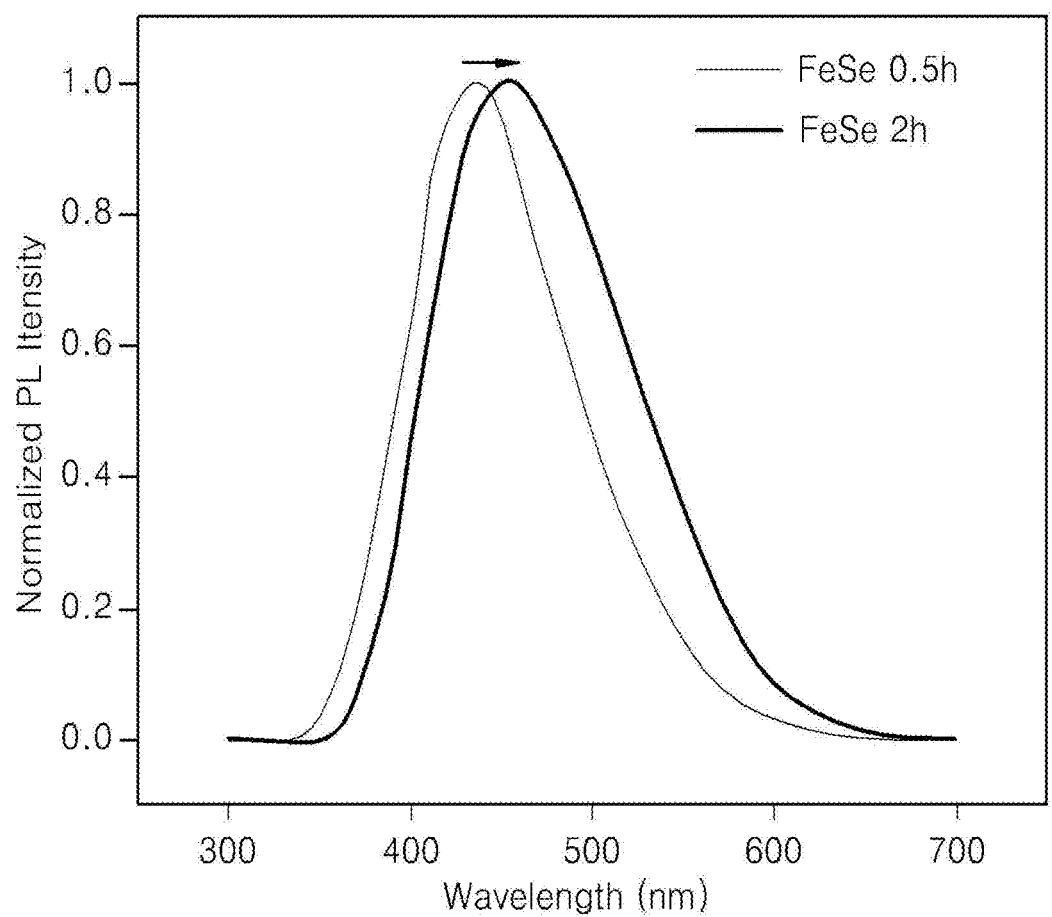
FIG. 18 shows absorbance and fluorescence spectra of FeSe, which were recorded at different reaction times (0.5 and 2 hours).
Figure 19:
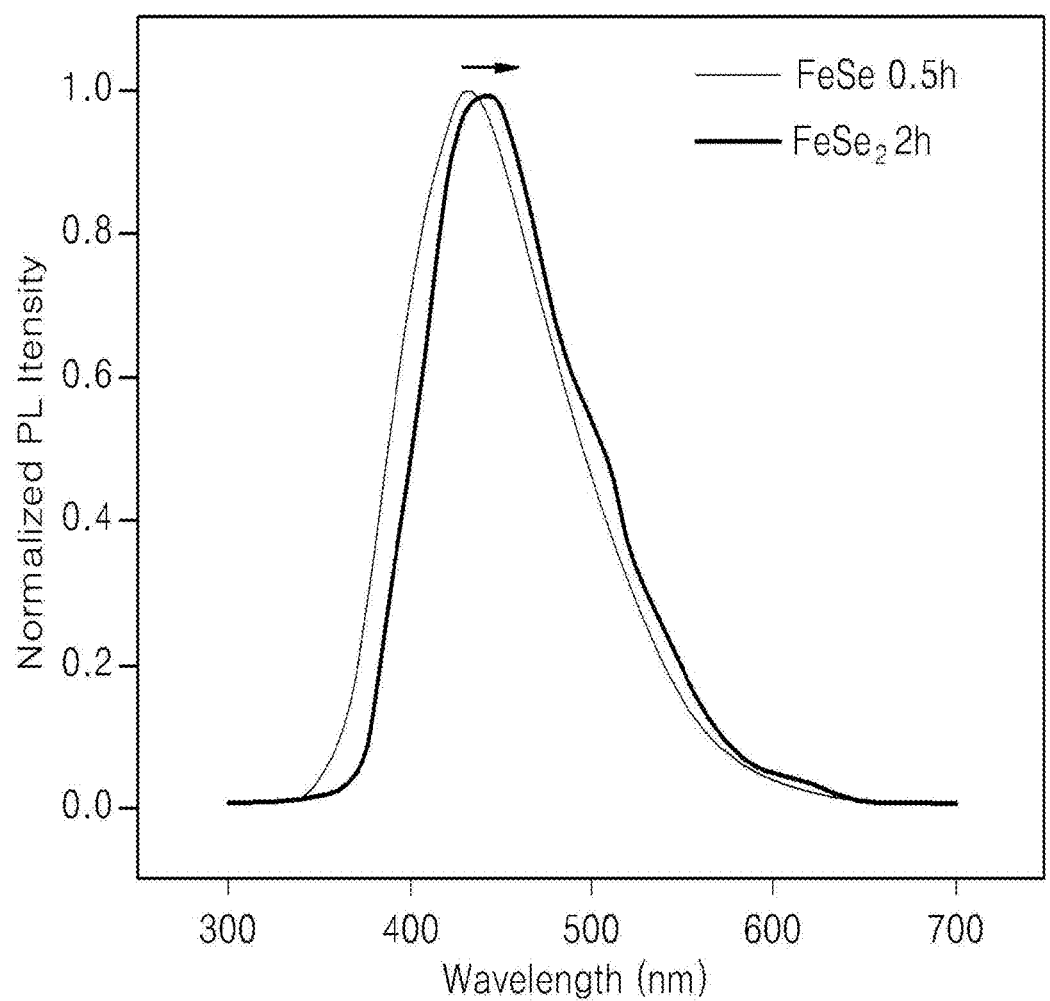
FIG. 19 shows absorbance and fluorescence spectra of $FeSe_2$, which were recorded at different reaction times (0.5 and 2 hours).

FIGS. 18 and 19 show the PL properties of the FeSe and $FeSe_2$ nanoparticles during growth. The PL spectra of the nanoparticles showed gradual red shifts with increasing reaction time, implying the growth of the nanoparticles.

As described above, the FeSe$_x$ (x=1, 2) nanocomposites had strong fluorescence peaks at wavelengths of 447 nm and 462 nm, respectively, and diameters of about 30 nm that correspond to the bandwidths of 2.25-2.51 eV, demonstrating new crystal characteristics of the nanocomposites. In conclusion, the FeSe$_x$ nanocomposites exhibited excellent photoluminescent properties even without heavy metals (Cd, Pb). Therefore, the FeSe$_x$ (x=1, 2) nanocomposites can be considered environmentally friendly alternatives to conventional photoluminescent materials.

INDUSTRIAL APPLICABILITY

The nanocomposite of the present invention exhibits high photoluminescence even without heavy metals. Therefore, the nanocomposite of the present invention can be considered an environmentally friendly alternative to conventional photoluminescent materials. In addition, the nanocomposite of the present invention appears to be useful for better band gap engineering of semiconductor nanoparticles. Furthermore, the synthetic approach is expected to offer tremendous potential to control the synthesis of other metal chalcogenides.

The invention claimed is:

1. A method for preparing an iron chalcogenide nanocomposite, comprising
   (a) dissolving a Fe precursor in an organic solvent to form a Fe solution,
   (b) dissolving a chalcogen powder or a chalcogen precursor in an organic solvent to form a chalcogen solution,
   (c) dropwise injecting the Fe solution into the chalcogen solution to prepare a mixture solution in which an iron chalcogenide is formed, and
   (d) purifying the iron chalcogenide from the mixture solution.

2. The method according to claim 1, wherein, in step (a) or (b), the organic solvent is heated to 100 to 140° C.

3. The method according to claim 1, wherein the organic solvent used in step (a) or (b) is selected from the group consisting of ether-based compounds (CnOCn, Cn: hydrocarbon, 4≤n≤30), hydrocarbons ($C_nH_{2n+2}$, 7≤n≤30), unsaturated hydrocarbons ($C_nH_{2n}$, 7≤n≤30), and organic acids ($C_n$COOH, $C_n$: hydrocarbon, 5≤n≤30).

4. The method according to claim 3, wherein the ether-based compounds are selected from the group consisting of trioctylphosphine oxide (TOPO), alkylphosphines, octyl ether, benzyl ether, and phenyl ether.

5. The method according to claim 3, wherein the hydrocarbons are selected from the group consisting of hexadecane, heptadecane, and octadecane.

6. The method according to claim 3, wherein the unsaturated hydrocarbons are selected from the group consisting of octene, heptadecene, and octadecene.

7. The method according to claim 3, wherein the organic acids are selected from the group consisting of oleic acid, lauric acid, stearic acid, mysteric acid, and hexadecanoic acid.

8. The method according to claim 3, wherein, in step (c), the Fe solution is injected dropwise into the chalcogen solution, followed by heating to 250 to 400° C. to prepare a mixture solution in which an iron chalcogenide is formed.

9. The method according to claim 3, wherein, in step (c), a surfactant is added to and mixed with the mixed solution.

10. The method according to claim 9, wherein the surfactant is an organic acid selected from the group consisting of oleic acid, lauric acid, stearic acid, mysteric acid, and hexadecanoic acid or is a mixture of these organic acids.

11. The method according to claim 3, wherein the Fe precursor and the chalcogen precursor are used in a molar ratio of 1:1-2.

12. The method according to claim 3, wherein the chalcogen is S, Se or Te.

13. The method according to claim 12, wherein the iron chalcogenide is FeSe or FeSe$_2$.

* * * * *